Figure 1:
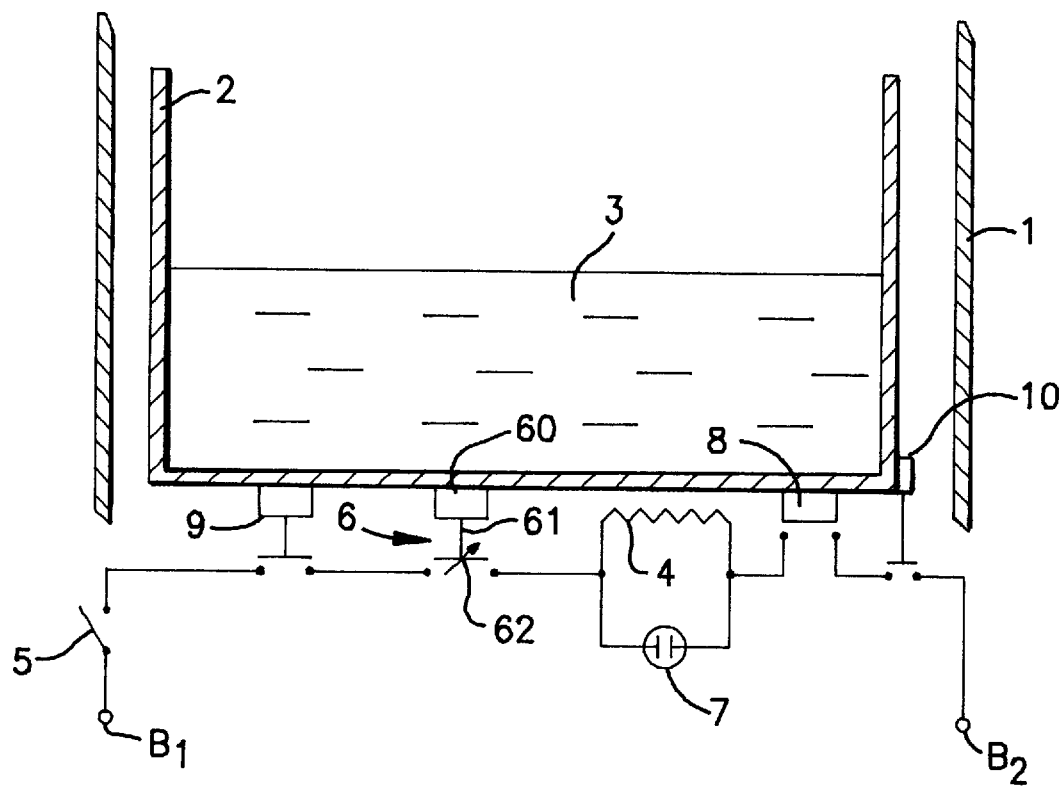

United States Patent
Baillieul

[19]

[11] Patent Number: 5,809,870
[45] Date of Patent: Sep. 22, 1998

[54] ELECTRIC DEEP FAT FRYER

[75] Inventor: Phillippe Louis Robert Baillieul, Saint Germain la Blacnhe Herbe, France

[73] Assignee: Moulinex S.A., Paris, France

[21] Appl. No.: 884,381

[22] Filed: Jun. 27, 1997

[30] Foreign Application Priority Data

Jun. 27, 1996 [FR] France ................................. 96 07983

[51] Int. Cl.⁶ .............................. A47J 36/38; A47J 37/12
[52] U.S. Cl. ............................... 99/330; 99/331; 99/403; 126/391; 219/441; 219/494
[58] Field of Search .................... 99/325, 326, 330–333, 99/403–418, 337, 338; 126/391; 219/494, 441, 435, 489; 210/167, DIG. 8, 184, 187

[56]  References Cited

U.S. PATENT DOCUMENTS

| | | | |
|---|---|---|---|
| 3,919,523 | 11/1975 | Wadia et al. . | |
| 4,217,482 | 8/1980 | Wadia . | |
| 4,282,423 | 8/1981 | Volz | 99/330 X |
| 4,505,193 | 3/1985 | Mariotti | 99/330 |
| 4,530,717 | 7/1985 | Bohrer, Jr. et al. | 99/403 X |
| 4,539,898 | 9/1985 | Bishop et al. | 99/407 |
| 4,574,185 | 3/1986 | Wenger | 219/494 |
| 4,580,038 | 4/1986 | O'Loughlin | 219/494 X |
| 4,668,390 | 5/1987 | Hurley et al. | 210/167 X |
| 4,913,038 | 4/1990 | Burkett et al. | 99/331 |
| 4,995,312 | 2/1991 | Leiros | 99/411 |
| 5,060,560 | 10/1991 | VanDeMark | 99/337 |
| 5,165,329 | 11/1992 | Jacob et al. | 99/407 |
| 5,297,474 | 3/1994 | Tabuchi | 210/DIG. 8 |
| 5,367,949 | 11/1994 | Nitschke et al. | 99/413 |

FOREIGN PATENT DOCUMENTS

| | | |
|---|---|---|
| 36 19 762 | 12/1987 | Germany . |
| 598 794 | 5/1978 | Switzerland . |
| WO 96/05761 | 2/1996 | WIPO . |

*Primary Examiner*—Timothy F. Simone
*Attorney, Agent, or Firm*—Young & Thompson

[57]  ABSTRACT

A domestic deep fat fryer comprising, in a housing (1), a vessel (2) adapted to contain a cooking bath (3). An electric heating resistance (4) heats the cooking bath. A thermal regulator (6) of high thermal inertia is mounted in series with the heating resistance and operates over a predetermined range of switching temperature. The fryer moreover comprises a thermostatic safety switch (8) mounted in series with the electric heating resistance and operating at a fixed switching temperature higher than the maximum temperature of the temperature range of the thermal regulator (6). This thermostatic safety switch has a thermal inertia less than that of the regulator (6) so as to detect abnormally rapid temperature increases and to cut off the electrical supply in such case to the electric heating resistance.

7 Claims, 1 Drawing Sheet

ELECTRIC DEEP FAT FRYER

This application corresponds to French application 96/07983 filed Jun. 27, 1996, the disclosure of which is incorporated herein by reference.

The present invention relates to domestic deep fat fryers of the type comprising, within a housing, a vessel adapted to contain a cooking bath, an electric heating resistance for heating the cooking bath, and temperature regulating means to regulate the temperature of the cooking bath, mounted in series with the heating resistance and operating over a predetermined range of temperatures, to permit the user to select the cooking temperature as a function of the foodstuffs to be fried.

For deep fat fryers of the preceding type, it is known to carry out temperature regulation of the bath by measuring, not directly the real temperature of the cooking bath, but a representative temperature measured on the external bottom of the vessel. The temperature regulation takes place conventionally by means of an adjustable thermostatic switch which opens the supply circuit for the heating resistance when the measured representative temperature exceeds the switching temperature of the switch. Given that the electrical heating resistance is disposed facing the bottom of the vessel, the temperature of the bottom of the vessel can be quite a bit higher than the actual temperature of the cooking bath, particularly at the beginning of the heating cycle of the cooking bath. To avoid the regulating thermostatic switch interrupting too often the supply of the heating resistance, which would lead to increase of the heating time of the cooking bath, it is known to associate the regulatory thermostatic switch with a temperature detector which comes into contact with the bottom of the vessel, and which transmits the information as to temperature to the thermostatic switch via a transducer.

This association permits having regulation means of high thermal inertia such that the representative temperature reflects best the temperature of the cooking bath during the cycle of temperature increase.

A drawback of this type of deep fat fryer resides in the fact that the thermal regulation means as described above do not operate in a satisfactory manner except with a cooking bath of normal size.

Moreover, it can occur that the user omits the oil or fat from the vessel, or else that the quantity of oil in the vessel will not be sufficient. Under such circumstances, there is a risk of overheating, either of the cladding of the vessel or of the cooking bath, before the regulation means with high thermal inertia have the time to react by cutting the supply of the electric heating resistance.

It is also known to provide, in series in the supply circuit of the electric heating resistance, a safety fuse disposed against the external bottom of the vessel, which cuts off the thermostatic switch in case of deterioration or poor functioning of this latter. In case of rapid heating of the vessel, the melting of the fuse permits throwing out the electric heating resistance circuit. The melting of the fuse ensures the safety of the user, but renders the deep fat fryer unusable until repair.

The present invention has for its object a domestic deep fat fryer which does not have the mentioned drawbacks.

More particularly, the present invention has for its object a domestic deep fat fryer of the type comprising, in a housing, a vessel adapted to contain a cooking bath, an electric heating resistance for heating the cooking bath, and temperature regulation means of high thermal inertia, mounted in series with the heating resistance and operating over a range of predetermined switching temperatures, characterized in that it comprises moreover a thermostatic safety switch mounted in series with the electric heating resistance and operating at a fixed switching temperature higher than the maximum temperature of said range, the thermostatic safety switch having moreover a thermal inertia less than that of the adjustment means so as to detect increases of temperatures that are abnormally rapid and to cut, as the case may be, the supply to the electric heating resistance.

The invention as well as the different advantages that it provides, will be better understood from the following description, given with reference to the accompanying single FIGURE of drawings.

In this FIGURE, there is shown schematically a view partially in cross section of a deep fat fryer according to a preferred embodiment of the invention, as well as the electrical connections of certain constituent elements of the deep fat fryer.

The illustrated deep fat fryer comprises conventionally a housing 1 within which is located a vessel 2 adapted to receive a cooking bath 3 constituted either by oil or by fat from the melting of a block of fat.

Heating of the cooking bath is carried out by means of an electrical heating resistance 4 disposed below the vessel 2. As shown on the electrical diagram, the electrical resistance 4 is connected in series with a channel switch 5 actuated by the user, and thermal regulation means 6, between the terminals B1 and B2 of the supply circuit. A control signal 7 mounted in parallel on the resistance 4 gives notice to the user that the resistance is supplied with voltage. The thermal adjustment means 6 are constituted so as to have a high thermal inertia. They comprise to this end a thermal detector 60 disposed directly in contact with the bottom of the vessel and connected to a thermostatic switch, for example of the bi-metal type 62, by means of a transducer 61. The thermostatic switch 62 is adjustable over a predetermined range of switching temperatures of the order of 110° C. to 140°C., so as to permit the user to select the cooking bath temperature over a given temperature range, typically from 160° C. to 190° C., for a normal load in the cooking bath, typically of the order of 2 to 2.2 liters. A thermal fuse 10 in contact with the vessel 2 is preferably provided to shut off the supply in the case of overheating.

According to one essential characteristic of the invention, the deep fat fryer comprises moreover a thermostatic switch 8, for safety, mounted in series with the heating electrical resistance 4, and operating at a fixed switching temperature higher than the maximum temperature of the switching temperature range for the adjustable thermostatic switch 6, for example of the order of 180°C. According to the invention, the security switch has a thermal inertia less than that of the regulating switch 6, so as to detect abnormally rapid rises of temperature.

In a preferred embodiment, the thermostatic safety switch is of the bi-metal type, disposed directly in contact with the external bottom of the vessel.

To actuate the fryer, the user selects the cooking bath temperature by operating the thermostatic regulation switch 62, and supplies voltage to the apparatus by closing the general switch 5. The regulation switch 62 and the safety switch 8 are both in closed position, so that the electric resistance can begin to heat.

If the cooking bath 3 corresponds to a normal load, the temperature of the cooking bath will increase slowly to the temperature selected by the user. The adjustment and high thermal inertia of the regulation means 6 permit optimizing the duration of heating by preventing a cutoff of power supply during the phase of temperature rise. During the cooking phase, the thermostat 62 plays its role of temperature regulator by passing alternately from an open position to a closed position. In this case of normal use, the safety switch 8 does not operate.

On the other hand, in the absence of a cooking bath in the vessel, the temperature of the vessel would raise very rapidly. Tests carried out by the applicant have shown that cutting the safety switch 8 takes place after about 2 minutes and 30 seconds of operation, at the end of which time the temperature of the vessel remains below 300°C, which permits protecting the non-stick coating of the vessel.

Comparative tests have shown that the use of the regulation switch 62 does not cut off the supply until about 3 minutes and 30 seconds, the temperature of the vessel then being higher than 300°C.

Moreover, if the cooking bath present in the vessel is insufficient, corresponding for example to a level of 1 centimeter above the bottom of the vessel, the temperature increase will also be very rapid. The lower thermal inertia of the safety switch permits it to intervene and to cut the supply of the heating resistance 4. Tests carried out by the applicant have shown that the cut off takes place such that the temperature of the cooking bath does not exceed 280°C. This latter therefore does not risk catching of fire.

In a particularly desirable embodiment of the invention, the vessel 2 is removable. In this case, the deep fat fryer comprises preferably a detector for the presence of the vessel 9 which operates as a switch in series in the supply circuit of the electrical resistance 4 as will be seen on the electrical diagram. It can happen that the vessel will be badly positioned in the housing 1 and have poor contact with the resistance 4, whilst establishing the contact with the presence detector 8. To overcome this drawback, the thermostatic safety switch 8 is disposed adjacent the heating electric resistance. This arrangement thereby permits the rapid detection of excess radiation from the heating resistance 4, and to cut off the supply.

In addition to priority interventions of the safety switch 8 in the case of abnormally rapid temperature increase, this switch 8 preferably operates the relay of the regulation switch 62 in the case of malfunction of this latter, which permits avoiding any overheating of the oil without requiring the fuse 10. This latter thus becomes an ultimate safeguard, adjusted for example to about 180°C.

In practice, there could be used for example a thermostat of the type 261, sold by the ELTH company, as a safety thermostat, and a thermostat of the type 141.141 sold by the TSB company, as a regulation thermostat.

What is claimed is:

1. In a domestic deep fat fryer comprising, in a housing (1), a vessel (2) adapted to contain a cooking bath (3), an electric heating resistance (4) for heating the cooking bath, and thermal regulation means (6) of high thermal inertia, mounted in series with the heating resistance and operating over a predetermined range of switching temperatures; the improvement comprising a safety thermostatic switch (8) mounted in series with the heating electric resistance and operating at a fixed switching temperature higher than the maximum temperature of said range, the safety thermostatic switch having a thermal inertia less than that of the regulation means (6) so as to detect abnormally higher increases of temperature and thereupon to cut off the electrical supply of the electrical heating resistance.

2. Domestic deep fat fryer according to claim 1, wherein said thermal regulation means (6) comprise a temperature detector (60) disposed in contact with the bottom of the vessel and connected to a thermostatic regulating switch (62) via a transducer (61).

3. Domestic deep fat fryer according to claim 1, wherein said thermostatic safety switch (8) is disposed in direct contact with the bottom of the vessel.

4. Domestic deep fat fryer according to claim 1, wherein the vessel (2) is removable, and wherein the deep fat fryer comprises moreover a detector (9) of the presence of the vessel operating as a switch in series with the electrical heating resistance (4).

5. Domestic deep fat fryer according to claim 1, wherein the thermostatic safety switch (8) is disposed adjacent the electrical heating resistance.

6. Domestic deep fat fryer according to claim 2, wherein the thermostatic regulating switch (62) has a range of switching temperatures from about 110° C. to about 140° C.

7. Domestic deep fat fryer according to claim 1, wherein the thermostatic safety switch (8) has a switching temperature of about 180° C.

* * * * *

UNITED STATES PATENT AND TRADEMARK OFFICE
CERTIFICATE OF CORRECTION

PATENT NO. : 5,809,870
DATED : September 22, 1998
INVENTOR(S) : Philippe Louis Robert BAILLIEUL It is certified that error appears in the above-indentified patent and that said Letters Patent is hereby corrected as shown below:

On the title page, Item [75], change the inventor's forename from "Phillippe" to --Philippe--.

Signed and Sealed this

Twelfth Day of January, 1999

Attest:

Attesting Officer

Acting Commissioner of Patents and Trademarks